United States Patent Office 2,955,376
Patented Oct. 11, 1960

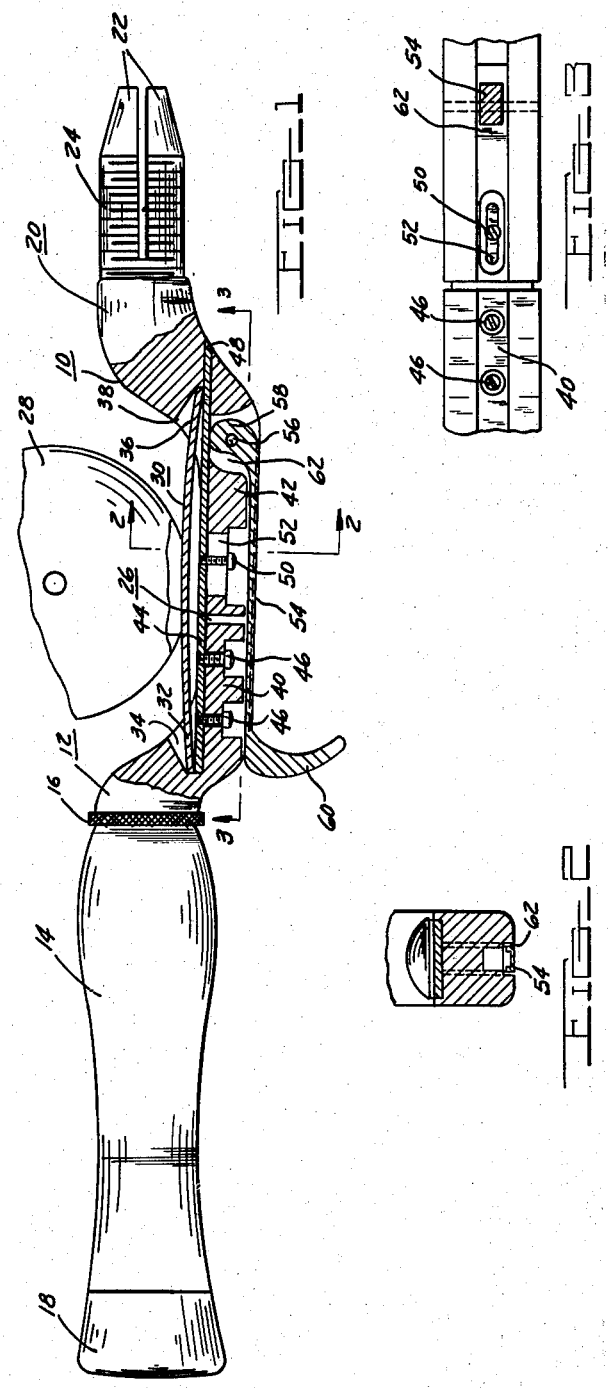

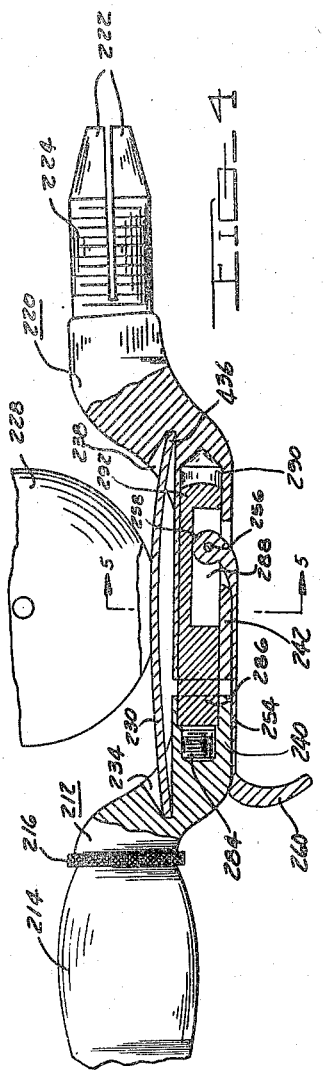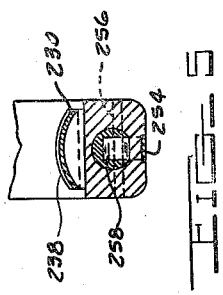
INVENTOR.
HERMAN A. ZEIGLER
BY
Smith, Wilson, Lewis & McRae

2,955,376
FISHING ROD HANDLE, WITH REEL, SELF-LOCKING DEVICE

Herman A. Zeigler, 22601 Beech St., Dearborn, Mich.

Filed Nov. 6, 1957, Ser. No. 694,792

8 Claims. (Cl. 43—22)

This invention relates to fishing rod handles, and more particularly to a handle adapted to grip and hold a reel such as a casting reel or a spin cast or trolling reel in an improved manner.

Fishing reels are customarily provided with a relatively thin rectangular shaped base adapted to be secured to a depressed portion of a handle in order to position the reel in such a manner that the fisherman can place his thumb on the reel to provide a controlled drag thereon. The fisherman is thus able to control the rotation of the reel and the flow of the line from the reel to prevent the line from becoming doubled back upon itself to cause a back-lash resulting in the tangling of the line.

In securing such reels to rod handles it has been common practice to project one end of the rectangular shaped base into an undercut portion formed in the base of the handle and to push a ferrule over the other end of the base of the reel to fasten it to the rod.

This type of fastener has not proven to be fully satisfactory because it does not hold the reel with a sufficient degree of firmness and as a result the rod, reel and handle combination do not present to the fisherman a feeling of solidness. This type of fastener is difficult to use and does not hold the reel from shifting sidewise slightly, particularly while the fisherman is attempting to land a heavy fish.

An object of my invention is to provide an improved casting rod having a novel reel clamping mechanism whereby the reel can be firmly clamped to the rod-carrying handle in such a manner as to prevent the reel from shifting on the handle, particularly when subjected to heavy stresses.

A further object of my invention resides in the provision of an improved attaching mechanism for securing a reel to a handle in such a manner that a single handle may readily receive reels having several different sizes of bases.

Another object of my invention is to provide a novel reel attaching mechanism which can readily be operated and which does not require any particular skill whereby an angler can quickly assemble his rod and reel and be ready for fishing with the minimum delay.

Still a further object of my invention is to provide an improved attaching mechanism for securing a reel to a rod handle wherein a cam actuated by a relatively long lever arm terminating in a finger grip portion is adapted to be grasped by a fisherman's forefinger while manipulating the rod and reel thereby insuring that the locking mechanism will not become disassembled while in use.

A further object of my invention resides in the provision of a reel clamping mechanism wherein no loose pieces are employed thereby eliminating the possibility that a day's fishing will be spoiled by reason of the angler's inability to assemble his equipment because a loose piece has become misplaced.

Yet another object of my invention is to provide an improved casting reel supporting rod handle which can be economically manufactured and which inherently possesses strong sales appeal for attracting a fisherman's interest in its ability to hold the reel in assembled relation with the rod and handle in an interesting and improved manner.

Other objects and advantages of my invention will be apparent from the following detailed description, considered in conjunction with the accompanying drawings submitted for illustrative purposes only, and not intended to define the scope of the invention, reference being had for that purpose to the subjoined claims.

In the drawings, wherein similar reference characters refer to similar parts throughout the several views:

Fig. 1 is a longitudinal view, partly in section, of a fishing reel receiving handle embodying my invention.

Fig. 2 is a fragmentary sectional view taken substantially on the line 2—2 of Fig. 1, looking in the direction of the arrows.

Fig. 3 is a bottom plan view, showing the actuating lever in section, taken substantially on the line 3—3 of Fig. 1 and showing the construction of features thereof.

Fig. 4 is a fragmentary view similar to Fig. 1 illustrating a still further modified form of the invention.

Fig. 5 is a sectional view taken substantially on the line 5—5 of Fig. 4 looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now more particularly to Fig. 1 it will be noted that my improved handle for receiving a rod and a fishing reel embodies a frame member 10 which may be formed in any desired manner as by a casting operation or by a stamping process or by machining. The frame member 10 has a rear hand member 12 preferably provided with a cork grip section 14 of hollow construction secured in any desired manner to the frame member end portion 12. The cork grip preferably fits up against a flange 16, and it is secured in place in any desired manner as by gluing. A plastic butt cap 18 which desirably may be formed of different colored plastics to lend interest to the handle is secured to the end thereof.

My improved casting reel handle has a forward rod receiving member 20, preferably substantially aligned with the rear hand portion 12, and having a slotted forward section to provide contractible fingers 22 adapted to grip and hold a rod when the fingers 22 are compressed by an internally threaded locking ferrule threaded onto a threaded section 24 of the forward section 20. It will be understood of course that if desired a collet may be employed to secure the rod in the handle.

A depressed reel supporting section 26 is interposed between the rear hand grip portion 12 and the forward rod receiving portion 20. The depressed portion 26 serves to position the reel relatively low with respect to the cork grip section 14 so that a fisherman, while maintaining his fingers wrapped around the cork grip portion 14 may rest his thumb on the rotatable spool or the actuating button of the reel 28 in such a manner that he can control the flow of line from the reel, and when occasion demands, he can press his thumb against the line to exert a braking force when a fish is in the process of being caught.

It will be noted that the reel 28 is provided with a reel base 30 of relatively thin and elongated rectangular shape having its rear end portion 32 extending into an undercut portion 34 formed in the rear hand portion 12, and having its forward end portion 36 projected into an undercut portion 38 formed in the forward rod carrying portion 20.

It will be noted that the depressed reel supporting section 26 is formed by a depressed portion or finger 40 of the rear hand portion 12 and an aligned depressed portion or finger 42 of the forward rod receiving portion 20. A reel base seat 44 which may take any desired form is illustrated as being a rectangular shaped bar secured as by screws 46 to the depressed portion 40 of the rear hand portion 12. The reel base seat 44 is slidably mounted in a slot 48 formed in the forward rod receiving portion 20 and guided with respect thereto by means of a screw 50 slidably mounted in a slot 52 formed in the depressed portion 42 of the forward rod receiving portion 20. It will be noted that the reel base seat 44 provides the bottom of the undercut portions 34 and 38 of the rear and front handle portions and provides the support for the reel base 30 of the reel 28.

A locking lever 54 is pivotally mounted on a pivot pin 56 projecting through and secured in the sidewalls of the forward rod receiving portion 20. The locking lever 54 is provided with a cam section 58 adapted to engage the bottom of the reel base seat 44 and deflect it upwardly to securely clamp the reel 28 to the handle. The locking lever 54 is provided with a trigger 60 positioned to underlie the forward end of the rear handle portion 12 in such a manner that a fisherman's forefinger can engage the trigger to provide a firmer and more comfortable grip for holding the handle, and to assure him that his reel is securely clamped in the handle.

As illustrated in Figs. 1 to 3 the depressed portions 40 and 42 are longitudinally slotted as illustrated at 62 to receive the handle of the locking lever 54, thereby presenting a neat appearance, and providing a substantially uninterrupted surface contour to be engaged by the fisherman's forefinger. The reel 28 is then positioned in operative position on the handle by positioning the reel base 30 on the reel base seat 44 with opposite ends of the reel base 30 aligned with and projecting into the undercut portions 34 and 38 of the rear and forward portions 12 and 20 of the handle.

In assembling the reel relative to the handle the locking lever 54 is moved by grasping the trigger mechanism 60 and moving it to oscillate the lever 54 in the counterclockwise direction about the pivot pin 56 thereby releasing the engaging portion of the cam 58 from the bottom of the reel base seat 44 to the released or unclamped position. The handle sections 12 and 20 are separated whereupon the screw 50 carried by the reel base seat 44 is moved to the rearward end of the slot 52 formed into depressed portion 42 of the forward handle 20. One end of the reel base 30 is then positioned in one of the undercut portions 34 or 38, and the other end portion is dropped onto the reel base seat 44 in alignment with the other undercut portion. The front and rear handle sections 20 and 12 respectively are then pushed together, the depressed portion 42 of the forward section 20 moving relative to the depressed portion 40 of the rear handle section 12, the slot 52 moving on the screw 50 until the ends of the reel base 30 engage at the end of the undercut sections 34 and 38. The locking lever 54 is then oscillated in the clockwise direction about the pivot pin 56 whereupon its cam shaped outer end surface engages the bottom of the reel base seat 44 and deflects it upwardly to wedge the reel base 30 in a handle portion defining the undercut portions 34 and 38.

When the locking lever 54 has been moved to the end of its travel as illustrated in the position shown in Fig. 1, the trigger 60 is positioned in operative relation relative to the handle 12 whereupon the fisherman may rest his forefinger on the trigger 60 to securely hold the assembly in the locked position. It will be noted that when the lever 54 is in the locking position as shown in Fig. 1, the point of contact of the cam 58 is in an over-center position whereupon the assembly is securely locked in the reel holding position.

With the hand positioned on the cork grip 14 and the forefinger engaging the trigger 60 the fisherman can readily position his thumb on the rotatable spool of the reel 28 or on the control button of a spin cast reel or on the control of a trolling reel to guide the line in its travel from the spool thereby insuring controlled flight of the line and guarding against back-lashes or tangling of the line.

The embodiment of my invention illustrated in Figs. 4 and 5 is similar in broad aspects to that illustrated in Figs. 1 to 3. Corresponding parts have therefore been given corresponding reference numerals with the addition of 200. The depressed section 240 of the handle portion 212 is provided with a threaded bore 284 to receive a threaded rod 286 adapted to project into a bore 290 formed in the depressed portion 242 of the forward rod receiving portion 220, and having a cut out portion 288. It will be noted that the rod 286 projecting into the bore 290 has a solid or an uninterrupted forward end 292 against which the forward end of the locking lever 254 abuts when the locking lever is moved in the counterclockwise position about the pivot pin 256 to permit elongation of the forward and rear sections 220 and 212 of the handle to permit the reel base 230 to be assembled into the undercut portions 234 and 238 thereof.

The handle portions 212 and 220 are then moved toward each other in the telescopic direction to such a point that the reel base 230 engages at the end of the undercut portions 234 and 238. The locking lever 254 is then oscillated in the clockwise direction about the pivot pin 256 to cam upwardly the outer end of the rod 286 and the depressed portion 242 of the forward handle portion 220 to exert a wedging action on the reel base 230 whereupon the reel is securely clamped in the handle.

I claim:

1. In a handle for a fishing reel, a hand-grip member having a forwardly projecting finger; a separate rod-holding member having a rearwardly projecting finger; said fingers forming a depressed reel-supporting section interposed between the hand-grip member and the rod-holding member; said reel-supporting section comprising an elongated seat for the base of a reel said seat being fixedly secured to one of said projecting fingers and slidably secured to the other of said fingers; a first undercut portion at one end of the seat for engaging the first end of a reel base; a second undercut portion at the opposite end of the seat for engaging the second end of a reel base; and manually operable cam means to lock the hand-grip member and the rod-holding member together in reel-engaging position.

2. The invention defined in claim 1 wherein the reel-base seat is fixed to the hand-grip member and extends into a slot formed in the rod-holding member; a stop member secured to the underside of the reel-base seat and extending into a slot formed in the rod-holding member to limit the longitudinal movement of said hand-grip member relative to the rod-holding member.

3. The invention defined in claim 2 wherein the pivotal cam means comprise a cam member pivotally mounted on the rod-holding member beneath the reel-base seat; an elongated lever operably connected to the cam member to pivot it about its axis; the depressed reel-supporting section having a slot in the underside thereof to receive the elongated lever in a reel-locking position aligned with the reel-supporting section; and a trigger-shaped member carried by the elongated lever to occupy a position forwardly of the hand-grip member; said trigger-shaped member adapted to be grasped by a fisherman's forefinger when the lever is in a reel-locking position.

4. The combination of a fishing reel handle and a fishing reel provided with an elongated base comprising a fishing reel handle having separate hand-grip and rod-holding sections longitudinally spaced by a depressed reel-supporting portion intermediate said sections; confronting undercut portions in the hand-grip and reel-holding sections aligned with the depressed portion; a reel-base receiving support carried by one of the hand-grip and reel-holding sections to be longitudinally movable relative to the other of said sections whereby to provide an extended open position of the handle to receive the ends of the reel base in the undercut portions and a closed position of the handle to releasably engage the base of the reel; said handle being securable in its closed position by means of manually operable camming means including a rotatable camming member engageable with the reel-base support; and a cam operating lever movable to a reel-clamping position whereby the lever will be aligned with the hand-grip member; said lever having a trigger-shaped member to underly the rear end of the depressed portion of the handle.

5. A fishing reel handle comprising a hand-grip member having a forwardly projecting finger; a separate rod-holding member having a rearwardly projecting finger; said forwardly and rearwardly projecting fingers forming a depressed reel-supporting section between the hand-grip and rod-holding members; the rod-holding member and hand-grip member being connected by a reel-base seat fixed to said forwardly projecting finger and slidably secured to said rearwardly projecting finger; a first undercut portion at one end of the reel-base seat for engaging the first end of a fishing reel-base; a second undercut portion at the opposite end of the reel-base seat for engaging the second end of a fishing reel-base; and a pivotal cam member mounted on the rod-holding member beneath the reel-base seat for releasably engaging the reel-base seat whereby to provide an extended open position of the handle to receive the ends of a reel-base in the undercut portions and a locked position to releasably engage the base of a reel; an elongated lever operably connected to the cam member to pivot said member about its axis; the depressed reel-supporting section having a slot in the underside thereof to receive the elongated lever in a reel-locking position aligned with the reel-supporting section; and a trigger shaped member carried by the elongated lever to occupy a position forwardly of the hand-grip member; said trigger-shaped member adapted to be grasped by a fisherman's forefinger when the lever is in reel-locking position.

6. In a handle for a fishing reel, a hand-grip member having a forwardly projecting finger; a separate rod-holding member having a rearwardly projecting finger; said fingers forming a depressed reel-supporting section interposed between the hand-grip member and the rod-holding member; a first undercut portion at one end of the reel-supporting section for engaging the first end of a reel base; a second undercut portion at the opposite end of the reel-supporting section for engaging the second end of a reel base; an elongated member fixedly secured to one of said projecting fingers and slidably secured to the other of said fingers; and manually operable cam means to lock the hand-grip member and the rod-holding member together in reel-engaging position.

7. The invention defined in claim 6 wherein the hand grip section and the rod holding section are movable longitudinally relative to each other, and a rod threadedly mounted in one of said sections and slidable in a bore in the other of said sections, a slot formed in the bottom of the threaded rod to receive the cam means pivoted in the section having the bore to limit longitudinal movement of the hand grip section relative to the rod holding section.

8. The invention defined in claim 6 wherein the hand grip and the rod holding sections are longitudinally movable relative to each other, and a rod fixed to one of said sections and slidably mounted in the other of said sections, a slot formed in the rod to receive the cam locking means to limit the longitudinal movement of the hand grip section relative to the rod holding section.

References Cited in the file of this patent

UNITED STATES PATENTS

| | | |
|---|---|---|
| 651,148 | Shakespeare | June 5, 1900 |
| 1,923,035 | Hoerle | Aug. 15, 1933 |
| 2,456,681 | Culver | Dec. 21, 1948 |